(12) United States Patent
Sato

(10) Patent No.: US 9,032,008 B2
(45) Date of Patent: May 12, 2015

(54) COMMUNICATION DEVICE, RECEPTION DATA LENGTH DETERMINATION METHOD, MULTIPLE DETERMINATION CIRCUIT, AND RECORDING MEDIUM

(75) Inventor: Fuyuta Sato, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 845 days.

(21) Appl. No.: 12/972,574

(22) Filed: Dec. 20, 2010

(65) Prior Publication Data

US 2011/0153708 A1    Jun. 23, 2011

(30) Foreign Application Priority Data

Dec. 22, 2009   (JP) .................................. 2009-291252

(51) Int. Cl.
*H04L 1/00* (2006.01)
*G06F 7/72* (2006.01)
*G06F 7/535* (2006.01)

(52) U.S. Cl.
CPC ........ *G06F 7/535* (2013.01); *H04L 1/00* (2013.01); *G06F 7/72* (2013.01)

(58) Field of Classification Search
CPC .............................. G06F 7/4917; G06F 7/535
USPC .................................................. 708/650–656
See application file for complete search history.

(56) References Cited

U.S. PATENT DOCUMENTS

| | | | | |
|---|---|---|---|---|
| 3,578,961 A | * | 5/1971 | Miu ................................ | 708/652 |
| 3,684,879 A | * | 8/1972 | Koehler ......................... | 708/656 |
| 3,733,477 A | * | 5/1973 | Tate et al. ...................... | 708/656 |
| 3,736,413 A | * | 5/1973 | Ferguson ....................... | 708/650 |
| 4,466,077 A | * | 8/1984 | Iannucci et al. .............. | 708/656 |
| 5,377,135 A | * | 12/1994 | Kuroiwa ........................ | 708/656 |
| 5,485,414 A | * | 1/1996 | Yao et al. ...................... | 708/655 |
| 6,138,138 A | | 10/2000 | Ogura | |
| 8,489,665 B2 | | 7/2013 | Sato et al. | |
| 2004/0246955 A1 | * | 12/2004 | Georgescu et al. ........... | 370/389 |
| 2006/0179102 A1 | * | 8/2006 | Carlough et al. ............. | 708/651 |
| 2009/0193066 A1 | * | 7/2009 | Sato et al. .................... | 708/651 |

FOREIGN PATENT DOCUMENTS

| | | |
|---|---|---|
| JP | 8-36483 A | 2/1996 |
| JP | 8-202534 A | 8/1996 |
| JP | 10-307707 A | 11/1998 |
| JP | 2009-205667 A | 9/2009 |

* cited by examiner

*Primary Examiner* — Chuong D Ngo
*Assistant Examiner* — Matthew Sandifer
(74) *Attorney, Agent, or Firm* — Fujitsu Patent Center

(57) ABSTRACT

A communication device includes a storage unit to store quotients and remainders associated with multiplication values obtained by multiplying a specified integer number, which is expressed in a form of $(2^\beta+\alpha)$ where $\beta$ is a positive integer number and $\alpha$ is a positive integer number other than integral multiples of 2, respectively, the quotients and the remainders being obtained by dividing the multiplication values by $2^\beta$, respectively, a first unit to divide a dividend by $2^\beta$ and calculate a quotient and a remainder, a second unit to obtain a quotient, which corresponds to the remainder from the storage unit, and a third unit to determine that the data length of the packet data is normal, when a combination of the quotient and the remainder calculated by the first unit is in the storage unit.

7 Claims, 11 Drawing Sheets

FIG. 5

| MULTIPLICATION VALUE | QUOTIENT | REMAINDER |
|---|---|---|
| (POWERS OF 2 + $\alpha$ )*1 | $N_1$ | $M_1$ |
| (POWERS OF 2 + $\alpha$ )*2 | $N_2$ | $M_2$ |
| (POWERS OF 2 + $\alpha$ )*3 | $N_3$ | $M_3$ |
| (POWERS OF 2 + $\alpha$ )*X | $N_x$ | $M_x$ |

FIG. 6

| MULTIPLICATION VALUE | QUOTIENT | REMAINDER |
|---|---|---|
| 7*1 | 1 | 3 |
| 7*2 | 3 | 2 |
| 7*3 | 5 | 1 |
| 7*4 | 7 | 0 |

FIG. 7

| MULTIPLICATION VALUE | QUOTIENT | REMAINDER |
|---|---|---|
| 13*1 | 1 | 5 |
| 13*2 | 3 | 2 |
| 13*3 | 4 | 7 |
| 13*4 | 6 | 4 |
| 13*5 | 8 | 1 |
| 13*6 | 9 | 6 |
| 13*7 | 11 | 3 |
| 13*8 | 13 | 0 |

FIG. 11

COMMUNICATION DEVICE, RECEPTION DATA LENGTH DETERMINATION METHOD, MULTIPLE DETERMINATION CIRCUIT, AND RECORDING MEDIUM

CROSS-REFERENCE TO RELATED APPLICATIONS

This application is based upon and claims the benefit of priority of the prior Japanese Patent Application No. 2009-291252, filed on Dec. 22, 2009, the entire contents of which are incorporated herein by reference.

FIELD

The present invention relates to a communication device, a reception data length determination method, a multiple determination circuit, and a recording medium.

BACKGROUND

In recent years, in communication devices such as mobile phones or the like that transmit and receive data in wireless communication networks for mobile phones or the like, a multiple determination operation for determining, on the basis of the regularity of a packet-specific length, specified between layers, whether or not a reception data length of a portion other than a header in a reception data is the integral multiple of the packet-specific length has been performed so as to confirm that the reception data is normal. The communication device performs a remainder calculation processing operation in which the reception data length is divided by a specified data length, and confirms that the reception data length is the integral multiple of the specified data length, when a remainder is zero.

For example, a technique is known in which the communication device performs the remainder calculation processing operation using a shift operation when an operand specified between layers is a power of 2. Since, in a data bit string that has a reception data length expressed by binary digits, a value indicated in lower digits than the most significant digit of an operand expressed by binary digits is a remainder, the communication device performs a right shift operation in which the data bit string is shifted to the right by (the most significant digit number of the operand −1) to calculate a remainder. In addition, the communication device confirms that the reception data is the integral multiple of the operand, when the calculated remainder is zero.

In addition, when the operand specified between layers is not a power of 2, the shift operation is not applied. Therefore, the communication device repeats subtracting the operand from the reception data length, calculates a final remainder, and determines whether or not the reception data is the integral multiple of the operand. In addition, another technique is known in which a communication device holds in advance, as fixed patterns, individual multiple values of an operand specified between layers, and determines whether or not the reception data is the integral multiple of the operand, by sequentially comparing the held fixed patterns with the reception data length.

In addition, examples of documents that disclose the techniques mentioned above include Japanese Laid-open Patent Publication No. 8-202534, Japanese Laid-open Patent Publication No. 8-36483, and Japanese Laid-open Patent Publication No. 10-307707.

When an operand specified between layers is not a power of 2, it is difficult for the communication device to perform at high speed a multiple determination operation for determining whether or not the reception data length is the integral multiple of the operand. Namely, the communication device repeats subtracting the operand from the reception data length until a remainder is calculated. Therefore, in the communication device, the number of subtraction increases in proportion to the length of the reception data, namely, in inverse proportion to the magnitude of the operand, thereby causing a significant reduction in the processing speed thereof. In addition, in the communication device, since the individual multiple values of the operand, held in advance, are sequentially compared with the reception data length, the number of comparison increases, thereby causing a reduction in the processing speed thereof.

SUMMARY

According to an aspect of the embodiment, a communication device including a storage unit to store quotients and remainders with associating the quotients and the remainders with multiplication values obtained by multiplying a specified integer number, which is expressed in the form of $(2^\beta+\alpha)$ where $\beta$ is a positive integer number and $\alpha$ is a positive integer number other than integral multiples of 2, by integer numbers ranging from 1 to $2^\beta$, respectively, the quotients and the remainders being obtained by dividing the multiplication values by $2^\beta$, respectively, a dividend setting unit to set, as a dividend, a data length of received packet data, a division unit to divide the dividend, set by the dividend setting unit, by $2^\beta$ and calculate a quotient and a remainder, a subtraction value determination unit to obtain a quotient, which corresponds to the remainder calculated by the division unit, from the storage unit, and determine whether or not a subtraction value, obtained by subtracting the obtained quotient from the quotient calculated by the division unit, is greater than the specified integer number, and a data length determination unit to determine that the data length of the packet data is a normal length, when the subtraction value determination unit determines that the subtraction value is not greater than the specified integer number and that a combination of the quotient and the remainder calculated by the division unit is in the storage unit, wherein the dividend setting unit sets the subtraction value as the dividend when the subtraction value determination unit determines that the subtraction value is greater than the specified integer number.

The object and advantages of the invention will be realized and attained at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a data structure of a subtraction pattern table;

FIG. 6 is a diagram illustrating an example of a data structure of the subtraction pattern table in a case of multiple rule determination with respect to "7";

FIG. 7 is a diagram illustrating an example of a data structure of the subtraction pattern table in a case of multiple rule determination with respect to "13";

FIG. 11 is a diagram illustrating examples of numerical values to which the packet determination processing operation according to the second embodiment is applicable.

DESCRIPTION OF EMBODIMENTS

Embodiments of a communication device, a reception data length determination method, a multiple determination circuit, and a recording medium, which are disclosed in the application, will be described in detail on the basis of figures, hereinafter. In the following embodiments, a case will be indicated in which the embodiments are applied to a communication device that transmits and receives communication data to and from another communication device using wireless or wired communication. However, the present invention is not limited to the embodiments, may be widely applied to a communication relay device that performs a digital processing operation using a packet when communication data is relayed from a communication device to another communication device using wireless or wired communication, and may also be applied to a mobile terminal device.

[First Embodiment]

Figure 1:
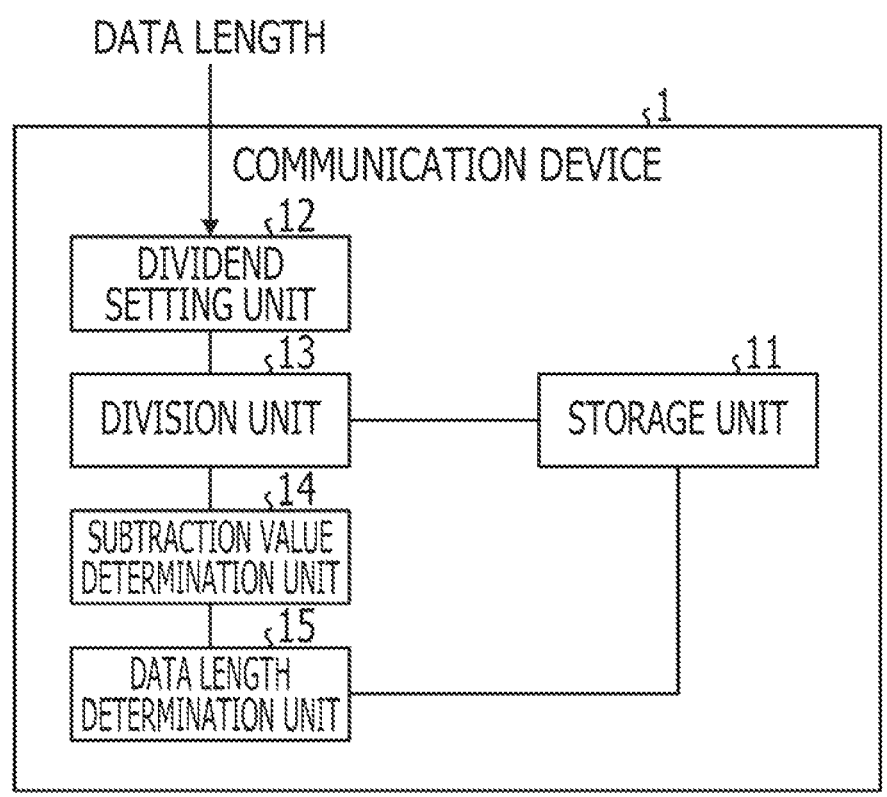
FIG. 1 is a functional block diagram illustrating a configuration of a communication device according to a first embodiment.

FIG. 1 is a functional block diagram illustrating a configuration of a communication device according to a first embodiment. As illustrated in FIG. 1, a communication device 1 includes a storage unit 11, a dividend setting unit 12, a division unit 13, a subtraction value determination unit 14, and a data length determination unit 15. By determining whether or not the data length of packet data received from a communication device at a transmitting side is a multiple of a specified integer number expressed in the form of ($2^\beta+\alpha$), the communication device 1 determines whether or not the data length of the packet data is a normal length. In this regard, however, it may be assumed that $\beta$ is a positive integer number, and $\alpha$ is a positive integer number other than integral multiples of 2.

The storage unit 11 stores therein quotients and remainders with associating the quotients and the remainders with multiplication values obtained by multiplying the specified integer number, which is expressed in the form of ($2^\beta+\alpha$) where $\beta$ is a positive integer number and $\alpha$ is a positive integer number other than integral multiples of 2, by integer numbers ranging from 1 to $2^\beta$, respectively, the quotients and the remainders being obtained by dividing the multiplication values by $2\beta$, respectively. Namely, in a case in which the data length of the received packet data is a multiple of the specified integer number, the storage unit 11 stores combinations of the quotients and the remainders, calculated as final results when the multiplication values are divided by $2^\beta$.

The dividend setting unit 12 sets, as a dividend, the data length of the received packet data. When the dividend setting unit 12 sets the dividend, the division unit 13 divides the dividend by $2^\beta$, and calculates a quotient and a remainder.

The subtraction value determination unit 14 obtains a quotient, which corresponds to the remainder calculated by the division unit 13, from the storage unit 11, and determines whether or not a subtraction value, obtained by subtracting the obtained quotient from the quotient calculated by the division unit 13, is greater than the specified integer number. Here, when the subtraction value determination unit 14 determines that the subtraction value is greater than the specified integer number, the dividend setting unit 12 sets the subtraction value as the dividend. In addition, when the dividend setting unit 12 sets the dividend, the division unit 13 divides the dividend by $2^\beta$ to calculate a quotient and a remainder.

In a case in which the subtraction value determination unit 14 determines that the subtraction value is not greater than the specified integer number, when the combination of the quotient and the remainder calculated by the division unit 13 is in the storage unit 11, the data length determination unit 15 determines that the data length of the packet data is a normal length.

In this way, in the communication device 1, when multiple determinations based on a specified integer number are performed with respect to the data length of packet data, a remainder obtained by dividing the dividend by $2^\beta$ matches a remainder in the storage unit 11, obtained by dividing a multiplication value by $2^\beta$, the multiplication value being obtained by multiplying the specified integer number by a positive integer number. Therefore, the following equation is met.

$$\text{A subtraction value} = (\text{a dividend} - (\text{a multiplication value obtained by multiplying a specified integer number by a positive integer number}))/2^\beta \quad (1)$$

On the basis of the equation (1), the communication device 1 subtracts at a time the multiplication value, obtained by multiplying the specified integer number by the positive integer number, from the dividend, and furthermore performs multiple determinations, based on the specified integer number, with respect to the subtraction value. Therefore, the multiple determinations can be performed at high speed. Furthermore, by setting $2^\beta$ as a divisor, the communication device 1 can use a shift operation, thereby calculating a remainder at high speed. As a result, the communication device 1 can determine at higher speeds whether or not the data length of the packet data is a multiple of the specified integer number.

[Second Embodiment]

[Configuration of Communication Device According to Second Embodiment]

Figure 2:
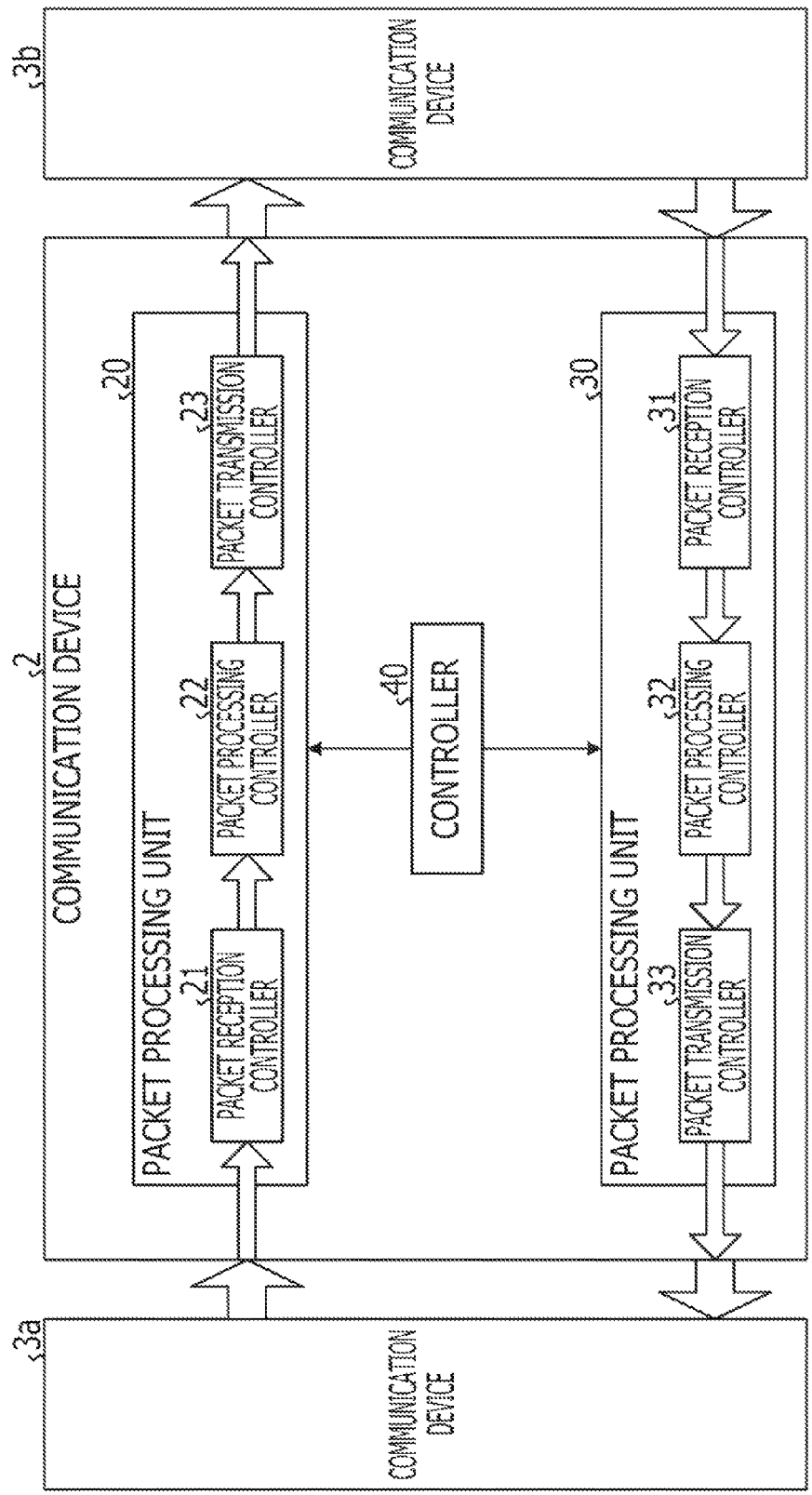
FIG. 2 is a functional block diagram illustrating a configuration of a communication device according to a second embodiment.

A configuration of a relay-use communication device for relaying a packet to be transmitted and received between communication devices according to a second embodiment will be described. FIG. 2 is a functional block diagram illustrating the configuration of a communication device 2 according to the second embodiment. As illustrated in FIG. 2, the communication device 2 according to the second embodiment relays a packet to be transmitted and received between a communication device 3a and a communication device 3b.

The communication device 2 includes a packet processing unit 20, a packet processing unit 30, and a controller 40. The packet processing unit 20 relays a packet received from the communication device 3a and transmits the packet to the communication device 3b. The packet processing unit 30 may also relay a packet received from the communication device 3b, and transmit the packet to the communication device 3a.

The packet processing unit 20 includes a packet reception controller 21, a packet processing controller 22, and a packet transmission controller 23. The packet reception controller 21 receives a packet from the communication device 3a, and obtains information relating to a packet length multiple rule from header information of the packet. Here, the packet length multiple rule indicates regularity that an actual packet length of a portion other than a header in a reception packet is a multiple of, for example, "5". In addition, on the basis of the packet length multiple rule, the packet reception controller 21 determines the multiple regularity of the packet length of the reception packet. In addition, when the determination result indicates that the packet length of the reception packet is a normal length, the packet reception controller 21 transmits the reception packet to the packet processing unit 22. On the other hand, when a determination result indicates that the packet length of the reception packet is not a normal length, the packet reception controller 21 performs a processing operation for discarding the reception packet. In addition, the multiple rule determination will be described later.

Along with the controller 40, the packet processing controller 22 controls packet disassembly/assembly or the like in response to the reception packet transmitted from the packet reception controller 21, and transmits the controlled packet to the packet transmission controller 23. The packet transmission controller 23 transmits, as a transmission packet, the packet transmitted from the packet processing controller 22 to the communication device 3b. In addition, the packet processing unit 30 also has substantially the same configuration and substantially the same function as those in the packet processing unit 20, and performs substantially the same processing operation as that in the packet processing unit 20. Therefore, the descriptions thereof will be omitted.

The controller 40 performs reception packet sequencing or reception packet retransmission control in response to an instruction of the packet processing controller 22, and transmits the controlled packet to the packet processing controller 22.

[Configuration of Packet Reception Controller in Communication Device According to Second Embodiment]

Figure 3:
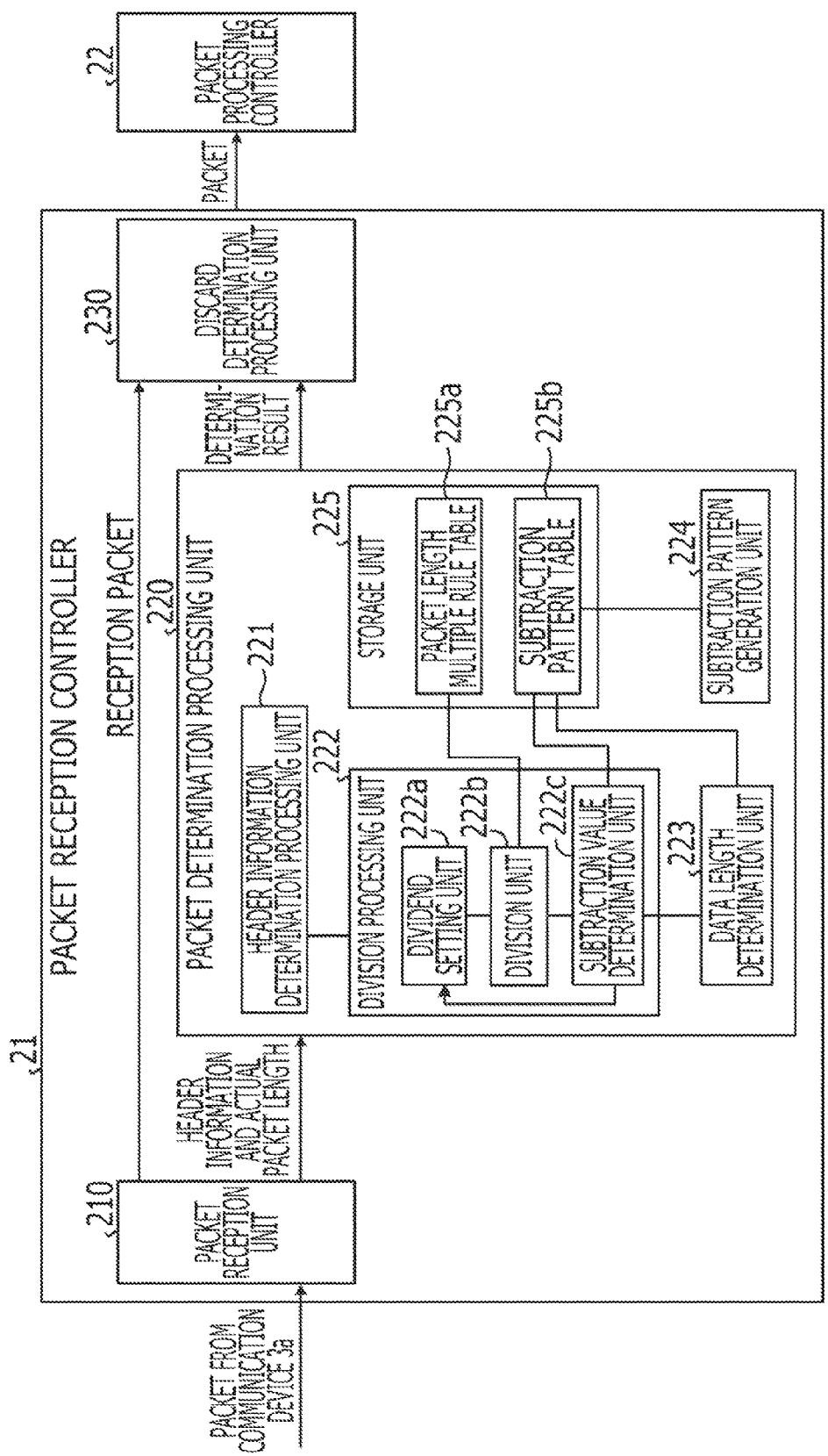
FIG. 3 is a functional block diagram illustrating a configuration of a packet reception controller in the communication device according to the second embodiment.

The configuration of the packet reception controller illustrated in FIG. 2 will be described. FIG. 3 is a functional block diagram illustrating the configuration of the packet reception controller 21 in the communication device 2 according to the second embodiment. The packet reception controller 21 in the communication device 2 according to the second embodiment includes a packet reception unit 210, a packet determination processing unit 220, and a discard determination processing unit 230.

The packet reception unit 210 transmits a reception packet to the discard determination processing unit 230. In addition, the packet reception unit 210 extracts a packet length and a packet length multiple rule type (described later) from the header information of the reception packet, and transmits the packet length and the packet length multiple rule type to the packet determination processing unit 220. In addition, the packet reception unit 210 measures the actual packet length of the reception packet, and transmits the actual packet length to the packet determination processing unit 220. In addition, the actual packet length indicates the length of a portion other than the header in the reception packet.

The packet determination processing unit 220 includes a header information determination processing unit 221, a division processing unit 222, a data length determination unit 223, a subtraction pattern generation unit 224, and a storage unit 225. In addition, the storage unit 225 includes a packet length multiple table 225a and a subtraction pattern table 225b. In addition, while the storage unit 225 is a storage element such as a register or the like, the storage unit 225 is not limited to the example, and may be a semiconductor memory device such as, for example, a random access memory (RAM), a flash memory, or the like, or may be a storage device such as a hard disk, an optical disk, or the like.

Figure 4:
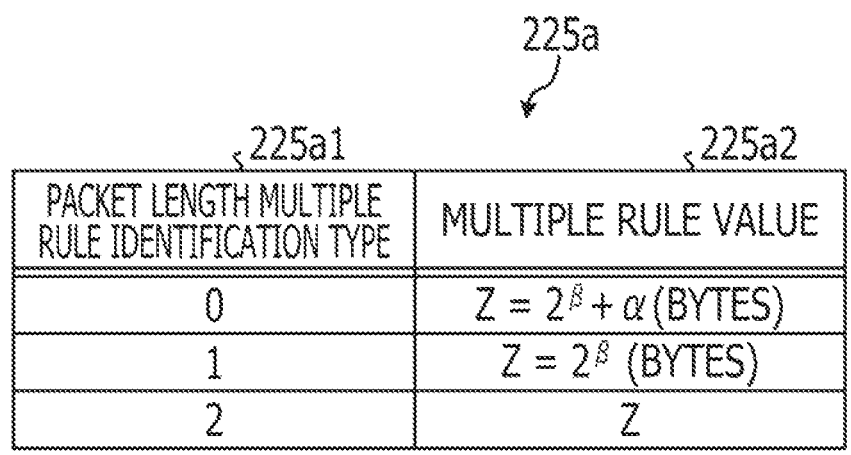
FIG. 4 is a diagram illustrating an example of a data structure of a multiple rule table for a data length of a packet.

Here, the packet length multiple rule table 225a will be described with reference to FIG. 4. FIG. 4 is a diagram illustrating an example of the data structure of a multiple rule table for the data length of a packet. As illustrated in FIG. 4, the multiple rule table 225a stores a multiple rule value 225a2 associated with a packet length multiple rule identification type 225a1. The packet length multiple identification type 225a1 indicates an identification type based on packet length multiple regularity. The multiple rule value 225a2 indicates a multiple rule value that corresponds to the packet length multiple identification type 225a1. In the example illustrated in FIG. 4, the packet length multiple identification type 225a1 is discriminated using a value of "0", "1", or "2". When the packet length multiple identification type 225a1 is "0", the packet length multiple identification type 225a1 indicates that the packet length multiple regularity corresponds to "powers of 2+ a multiple of $\alpha$" where s $\alpha$ is a positive integer number other than integral multiples of 2. In addition, the multiple rule value 225a2 is expressed in the form of "$Z = 2^\beta + \alpha$" where $\beta$ is a positive integer number and $\alpha$ is a positive integer number other than integral multiples of 2. "$2^\beta$" in the equation "$Z = 2^\beta + \alpha$" is called a "radix value of integral multiples of 2", and indicates the largest value of powers of 2 within less than "$2^\beta + \alpha$". In addition, when the packet length multiple identification type 225a1 is "1", the packet length multiple identification type 225a1 indicates that the packet length multiple regularity corresponds to a multiple of powers of 2. In addition, the multiple rule value 225a2 is expressed in the form of "$Z = 2^\beta$" where $\beta$ is a positive integer number. When the packet length multiple identification type 225a1 is "2", the packet length multiple identification type 225a1 indicates that the packet length multiple regularity corresponds to a fixed length. In addition, the multiple rule value 225a2 is expressed in the form of "Z" where Z is a positive integer number.

In addition, the subtraction pattern table 225b will be described with reference to FIGS. 5 to 7. FIG. 5 is a diagram illustrating an example of the data structure of the subtraction pattern table in a case of multiple rule determination with respect to "powers of 2+$\alpha$". In addition, FIG. 6 is a diagram illustrating an example of the data structure of the subtraction pattern table in a case of multiple rule determination with respect to "7" used as "powers of 2+$\alpha$", and FIG. 7 is a diagram illustrating an example of the data structure of the subtraction pattern table in a case of multiple rule determination with respect to "13" used as "powers of 2+$\alpha$".

As illustrated in FIG. 5, the subtraction pattern table 225b obtains multiplication values calculated by multiplying a specified integer number, which is expressed in the form of "$2^\beta + \alpha$", by integer numbers ranging from 1 to the radix value of powers of 2 ($2^\beta$), respectively. In addition, the subtraction pattern table 225b stores therein quotients and remainders associated with the multiplication values, respectively, the quotients and the remainders being obtained by dividing the multiplication values by a divisor $2^\beta$, respectively. Namely, in a case in which the actual data length of the reception packet is a multiple of the specified integer number, the subtraction pattern table 225b stores therein combinations of the quotients and the remainders, calculated as final results when the multiplication values are divided by $2^\beta$. Here, the specified integer number means a packet length included in the header information of the reception packet.

For example, when the specified integer number is "7", "$2^\beta+\alpha$" is "7", and "2" is the largest value of powers of 2 within less than "$2^\beta+\alpha$". Therefore, "2" turns out to be "$2^2=4$". In addition, the subtraction pattern table 225b stores therein quotients (1, 3, 5, and 7) and remainders (3, 2, 1, and 0) associated with multiplication values (7, 14, 21, and 28) obtained by multiplying "7" by integer numbers ranging from "1" to "4", respectively, the quotients (1, 3, 5, and 7) and the remainders (3, 2, 1, and 0) being obtained by dividing the multiplication values (7, 14, 21, and 28) by "4", respectively. Namely, in the case of the multiple rule determination with respect to "7", when the actual packet length of the reception packet is a multiple of "7", combinations of quotients and remainders, calculated as final results after the actual packet length has been repeatedly divided by "4", turns out to be (1, 3), (3, 2), (5, 1), and (7, 0).

In addition, as illustrated in FIG. 7, in a case of the multiple rule determination with respect to the specified integer number "13", "$2^\beta+\alpha$" is "13", and "$2^\beta$" turns out to be "$2^3=8$". In addition, the subtraction pattern table 225b stores therein quotients (1, 3, 4 . . . ) and remainders (5, 2, 7 . . . ) associated with multiplication values (13, 26, 39 . . . ) obtained by multiplying "13" by integer numbers ranging from "1" to "8", respectively, the quotients (1, 3, 4 . . . ) and the remainders (5, 2, 7 . . . ) being obtained by dividing the multiplication values (13, 26, 39 . . . ) by "8", respectively. Namely, in the case of the multiple rule determination with respect to "13", when the actual packet length of the reception packet is a multiple of "13", combinations of quotients and remainders, calculated as final results after the actual packet length has been repeatedly divided by "8", turns out to be (1, 5), (3, 2) . . . . In addition, with respect to each of packet lengths that can be included in the header information, the subtraction pattern table 225b is generated by the subtraction pattern generation unit 224 described later.

The subtraction pattern generation unit 224 calculates quotients and remainders obtained by dividing multiplication values by $2^\beta$, respectively, the multiplication values being obtained by multiplying a specified integer number, which is expressed in the form of "$2^\beta+\alpha$", by integer numbers ranging from 1 to $2^\beta$, respectively. In addition, the subtraction pattern generation unit 224 stores the quotients and the remainders for the individual calculated multiplication values in the subtraction pattern table 225b associated with the multiplication values, respectively, and hence generates the subtraction pattern table 225b. In addition, it is desirable that the subtraction pattern table 225b is generated in an initializing process on the start-up of the communication device 2.

On the basis of a packet length multiple identification type transmitted from the packet reception unit 210, the header information determination processing unit 221 determines whether a reception packet is a packet that has multiple regularity that does not correspond to powers of 2 or a packet that has multiple regularity that corresponds to powers of 2. In addition, when the reception packet is neither the packet that has multiple regularity that does not correspond to powers of 2 nor the packet that has multiple regularity that corresponds to powers of 2, the header information determination processing unit 221 determines whether or not the reception packet is a packet that has a fixed length. For example, when the packet length multiple rule type is "0", the header information determination processing unit 221 determines that the reception packet is a packet that has multiple regularity that does not correspond to powers of 2. When the packet length multiple rule type is "1", the header information determination processing unit 221 determines that the reception packet is a packet that has multiple regularity that corresponds to powers of 2. When the packet length multiple rule type is "2", the header information determination processing unit 221 determines that the reception packet is a packet that has a fixed length.

The division processing unit 222 includes a dividend setting unit 222a, a division unit 222b, and a subtraction value determination unit 222c. The dividend setting unit 222a sets the packet length of a reception packet, as an initial vale, to a dividend. Specifically, the dividend setting unit 222a set an actual packet length transmitted from the header information determination processing unit 221, as a dividend, to a variable U.

When the dividend setting unit 222a sets a value to the dividend, the division unit 222b calculates a quotient and a remainder by dividing the dividend by the divisor $2^\beta$. Specifically, the division unit 222b obtains a packet length multiple identification type and a packet length from the header information determination processing unit 221. In addition, in accordance with the obtained packet length multiple identification type, the division unit 222b selects, as a specified integer number, one multiple rule value from among a plurality of multiple rule values 225a2 stored in the multiple rule table 225a. Namely, when the obtained packet length multiple identification type is "0", the division unit 222b reads the multiple rule value 225a2 "$Z=2^\beta+\alpha$" that corresponds to the packet length multiple identification type 225a1 that is "0". In addition, the division unit 222b defines the packet length, obtained from the header information determination processing unit 221, as the specified integer number expressed in the form of "$2^\beta+\alpha$". In addition, β is a positive integer number, and α is a positive integer number other than integral multiples of 2.

In addition, the division unit 222b assigns the specified integer number to Z, and sets "$Z-\alpha=2^\beta$" (a value obtained by subtracting α from Z) to a variable V. In addition, the division unit 222b calculates a quotient N and a remainder M by dividing the variable U by the variable V.

The subtraction value determination unit 222c obtains a quotient, which corresponds to the remainder calculated by the division unit 222b, from the subtraction pattern table 225b, and subtracts the obtained quotient from the quotient calculated by the division unit 222b, thereby calculating a subtraction value. In addition, the subtraction value determination unit 222c determines whether or not the calculated subtraction value is greater than the specified integer number. Specifically, if the specified integer number is a multiple rule value Z ($2^\beta+\alpha$), the subtraction value determination unit 222c reads out a quotient $N_P$ (P=one of integer numbers ranging from 1 to X), which corresponds to a remainder $M_P$ (P=one of integer numbers ranging from 1 to X) that matches the remainder M calculated by the division unit 222b, from the subtraction pattern table 225b. In addition, the subtraction value determination unit 222c subtracts the read out quotient $N_P$ from the quotient N, thereby calculating a subtraction value ($N-N_P$). In addition, the subtraction value determination unit 222c determines whether or not the subtraction value ($N-N_P$) is greater than or equal to the multiple rule value Z ($2^\beta+\alpha$).

When the subtraction value determination unit 222c determines that the subtraction value is greater than the specified integer number, the dividend setting unit 222a sets the subtraction value to the dividend. Specifically, in a case in which the specified integer number is the multiple rule value Z ($2^\beta+\alpha$), when it is determined that the subtraction value ($N-N_P$) is greater than or equal to the multiple rule value Z, the multiple rule value can be subtracted from the subtraction value, and hence the dividend setting unit 222a sets the subtraction value ($N-N_P$) to the variable U.

When the subtraction value determination unit 222c determines that the subtraction value is not greater than the specified integer number, the data length determination unit 223 determines whether or not the combination of the quotient and the remainder calculated by the division unit 222b is to be found in the subtraction pattern table 225b. On the basis of the determination result, the data length determination unit 223 determines whether or not the data length of the reception packet is a normal length. Specifically, when it is determined that the subtraction value ($N-N_P$) is neither greater than nor equal to the multiple rule value Z, the data length determination unit 223 determines whether or not the combination of the quotient N and the remainder M matches one of combinations of the quotients 225b2 and the remainders 225b3 in the subtraction pattern table 225b. In addition, when it is determined that the combination of the quotient N and the remainder M matches one of combinations of the quotients 225b2 and the remainders 225b3 in the subtraction pattern table 225b, the data length determination unit 223 determines that the data length of the reception packet is a normal length. On the other hand, when it is determined that the combination of the quotient N and the remainder M matches none of combinations of the quotients 225b2 and the remainders 225b3 in the subtraction pattern table 225b, the data length determination unit 223 determines that the data length of the reception packet is not a normal length. In addition, the data length determination unit 223 notifies the discard determination processing unit 230 of the determination result.

When the determination result of which the data length determination unit 223 gives notice indicates that the data length of the reception packet is a normal length, the discard determination processing unit 230 transmits the reception packet transmitted from the packet reception unit 210 to the packet processing controller 22. In addition, when the determination result of which the data length determination unit 223 gives notice indicates that the data length of the reception packet is not a normal length, the discard determination processing unit 230 discards the reception packet transmitted from the packet reception unit 210.

[Subtraction Pattern Generation Processing Operation According to Second Embodiment]

Figure 8:
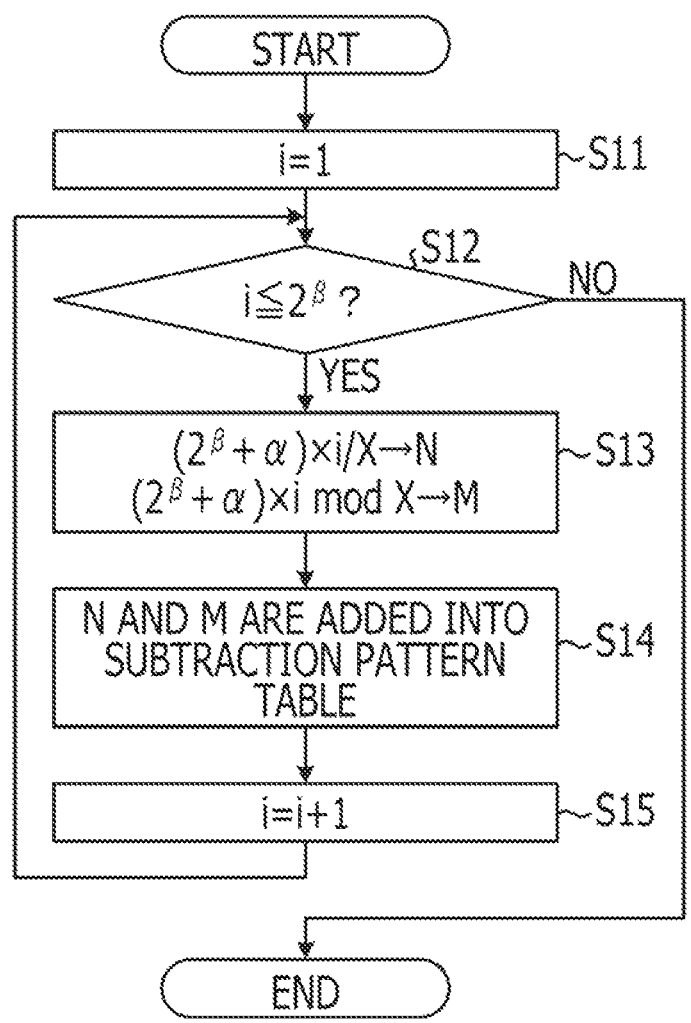
FIG. 8 is a flowchart illustrating a procedure of a subtraction pattern generation processing operation according to the second embodiment.

A subtraction pattern generation processing operation according to the second embodiment will be described. FIG. 8 is a flowchart illustrating a procedure of the subtraction pattern generation processing operation according to the second embodiment. In addition, it may be assumed that the subtraction pattern generation processing operation in a case in which the multiple rule value for a packet length is $2^\beta+\alpha$ where $\beta$ is a positive integer number and $\alpha$ is a positive integer number other than integral multiples of 2 is performed.

When the subtraction pattern generation unit 224 acquires a start-up instruction from the outside before the operation of the communication device 2 is started, the subtraction pattern generation unit 224 sets an initial value "1" to an index i (Operation S11). Next, the subtraction pattern generation unit 224 determines whether or not the value of the index i is less than or equal to $2^\beta$ (a radix value of powers of 2) (Operation S12). In addition, when the value of the index i is neither less than nor equal to $2^\beta$ (Operation S12: No), the subtraction pattern generation unit 224 finishes.

On the other hand, when the value of the index i is less than or equal to $2^\beta$ (Operation S12: Yes), the subtraction pattern generation unit 224 divides a multiplication value, obtained by multiplying ($2^\beta+\alpha$) by the value of the index i, by powers of 2×. In addition, the subtraction pattern generation unit 224 sets a quotient and a remainder, which are the division results, to N and M which are variables to be stored in a working memory, respectively (Operation S13). In addition, the remainder is calculated using mod operation.

Next, the subtraction pattern table generation unit 224 associates N and M with the multiplication value, and adds N and M into the subtraction pattern table 225b (Operation S14). In addition, the subtraction pattern table generation unit 224 adds "1" to the value of the index i (Operation S15), and makes the transition to Operation S12.

[Packet Determination Processing Operation According to Second Embodiment]

Figure 9:
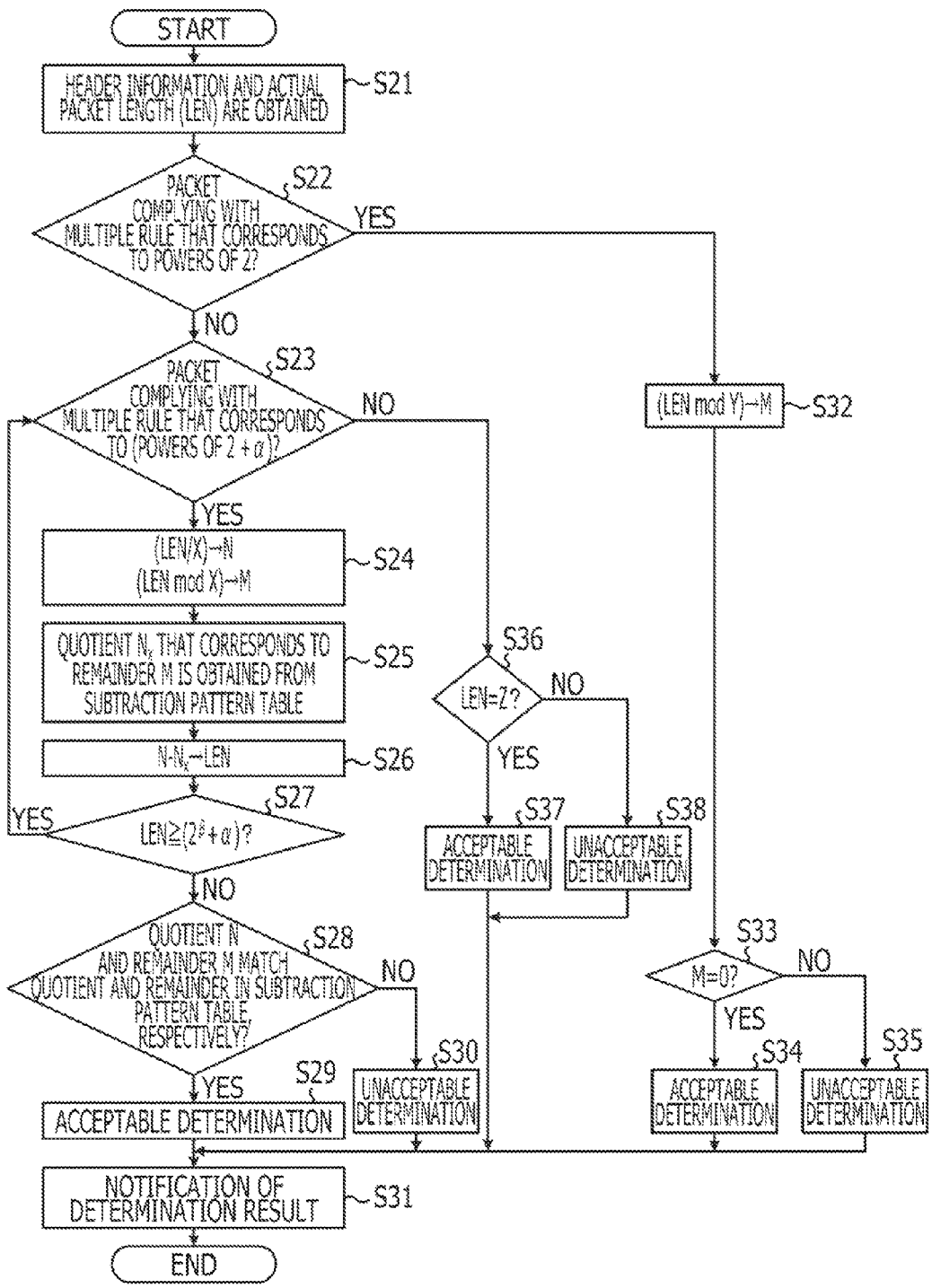
FIG. 9 is a flowchart illustrating a procedure of a packet determination processing operation according to the second embodiment.

A packet determination processing operation according to the second embodiment will be described. FIG. 9 is a flowchart illustrating a procedure of the packet determination processing operation according to the second embodiment. In addition, it may be assumed that the packet determination processing operation in a case in which the multiple rule value for a packet length is $2^\beta+\alpha$ where $\beta$ is a positive integer number and a is a positive integer number other than integral multiples of 2 is performed.

The header information determination processing unit 221 obtains the header information (a packet length multiple rule type and a packet length) and the actual packet length (abbreviated as "LEN", hereinafter) of a reception packet from the packet reception unit 210 (Operation S21).

The header information determination processing unit 221 determines whether or not the packet length multiple rule type is "1" (a packet complying with a multiple rule that corresponds to powers of 2) (Operation S22). In addition, when it is determined that the packet length multiple rule type is not "1" (Operation S22: No), the header information determination processing unit 221 determines whether or not the packet length multiple rule type is "0" (a packet complying with a multiple rule that corresponds to (powers of $2+\alpha$)) (Operation S23).

When it is determined that the packet length multiple rule type is "0" (Operation S23: Yes), the division unit 222b sets LEN and X to U (dividend) and V (divisor) which are variables to be stored in a working memory, respectively. Here, X indicates a value of powers of 2 expressed in the form of "powers of $2+\alpha$", illustrated in FIG. 4. In addition, the division unit 222b divides U by V. In addition, the division unit 222b sets a quotient and a remainder, which are the division results, to N and M which are variables to be stored in a working memory, respectively (Operation S24). In addition, the remainder is calculated using mod operation.

Subsequently, the subtraction value determination unit 222c obtains a quotient $N_P$ (P=one of integer numbers ranging from 1 to X), which corresponds to the remainder M calculated by the division unit 222b, from the subtraction pattern table 225b (Operation S25). In addition, the subtraction value determination unit 222c subtracts the obtained quotient $N_P$ from the quotient N calculated by the division unit 222b, and defines the subtraction value obtained by the subtraction as LEN (Operation S26).

In addition, the subtraction value determination unit 222c determines whether or not the subtraction value LEN is greater than or equal to the multiple rule value ($2^\beta+\alpha$) (Operation S27). In addition, when it is determined that the subtraction value LEN is greater than or equal to the multiple rule value ($2^\beta+\alpha$) (Operation S27: Yes), the dividend setting unit 222a sets the subtraction value LEN to U (dividend), and makes the transition to Operation S24.

On the other hand, when it is determined that the subtraction value LEN is neither greater than nor equal to the multiple rule value ($2^\beta+\alpha$) (Operation S27: No), the data length determination unit 223 determines whether or not the combination of the quotient N and the remainder M calculated by the subtraction value determination unit 222c is to be found in the subtraction pattern table 225b (Operation S28). In addition, when the combination of the quotient N and the remainder M is in the subtraction pattern table 225b (Operation S28: Yes), the data length determination unit 223 determines that the data length of the reception packet is a normal length, and sets "acceptable determination" as the determination result (Operation S29).

On the other hand, when the combination of the quotient N and the remainder M is not in the subtraction pattern table 225b (Operation S28: No), the data length determination unit 223 determines that the data length of the reception packet is not a normal length, and sets "unacceptable determination" as the determination result (Operation S30). In addition, the data length determination unit 223 notifies the discard determination processing unit 230 of the determination result (Operation S31).

In addition, when it is determined that the packet length multiple rule type is "1" (a packet complying with a multiple rule that corresponds to powers of 2) (Operation S22: Yes), the division unit 222b sets LEN and X to U (dividend) and V (divisor) which are variables to be stored in the working memory, respectively. Here, X indicates an integer number expressed in the form of "powers of 2", illustrated in FIG. 4. In addition, the division unit 222b divides U by V. In addition, the division unit 222b sets a quotient, which is a division result, to M which is a variable to be stored in the working memory (Operation S32). In addition, the remainder is calculated using mod operation.

In addition, the data length determination unit 223 determines whether or not the remainder M is "0" (Operation S33). When it is determined that the remainder M is "0" (Operation S33: Yes), the data length determination unit 223 determines that the data length of the reception packet is a normal length, and sets "acceptable determination" as the determination result (Operation S34). On the other hand, it is determined that the remainder M is not "0" (Operation S33: No), the data length determination unit 223 determines that the data length of the reception packet is not a normal length, and sets "unacceptable determination" as the determination result (Operation S35). In addition, the data length determination unit 223 makes the transition to Operation S31.

In addition, when it is determined that the packet length multiple rule type is "0" (Operation S23: No), the division unit 222b determines whether or not LEN is equal to Z (an integer number indicating a fixed packet length, illustrated in FIG. 4) (Operation S36). In addition, when it is determined that LEN is equal to Z (Operation S36, Yes), the data length determination unit 223 determines that the data length of the reception packet is a normal length, and sets "acceptable determination" as the determination result (Operation S37). On the other hand, when it is determined that LEN is not equal to Z (Operation S36, No), the data length determination unit 223 determines that the data length of the reception packet is not a normal length, and sets "unacceptable determination" as the determination result (Operation S38). In addition, the data length determination unit 223 makes the transition to Operation S31.

[Specific Example of Packet Determination Processing Operation According to Second Embodiment]

A specific example of the packet determination processing operation illustrated in FIG. 9 will be described separately divided into multiple determination based on the multiple rule value "7" and multiple determination based on the multiple rule value "26".

[Multiple Determination Based on Multiple Rule Value "7"]

A case in which whether or not the actual packet length is a multiple of the multiple rule value "7" ($=2^2+3$) is determined using "4" ($2^2$), which is a value of powers of 2, when the actual packet length is "364" (bytes: omitted hereinafter) will be described.

As described later, the division unit 222b divides the actual packet length "364" (LEN) by a value of powers of 2 "4" (first division), and sets division results to the quotient N and the remainder M, respectively.

364/4=91 (quotient N=91)

364 mod 4=0 (remainder M=0)

Subsequently, the subtraction value determination unit 222c subtracts a quotient "7" in the subtraction pattern table 225b (refer to FIG. 6), which corresponds to the remainder M ("0"), from the quotient N ("91"), and defines a subtraction value, obtained by the subtraction, as LEN.

91−7=84 (subtraction value LEN=84)

In addition, since, in the subtraction value determination unit 222c, the subtraction value LEN is greater than or equal to the multiple rule value "7", the division unit 222b divides the subtraction value LEN by the value of powers of 2 "4" (second division), and sets division results to the quotient N and the remainder M, respectively, as follows.

84/4=21 (quotient N=21)

84 mod 4=0 (remainder M=0)

Subsequently, the subtraction value determination unit 222c subtracts a quotient "7" in the subtraction pattern table 225b, which corresponds to the remainder M ("0"), from the quotient N ("21"), and defines a subtraction value, obtained by the subtraction, as LEN.

21−7=14 (subtraction value LEN=14)

In addition, since, in the subtraction value determination unit 222c, the subtraction value LEN is greater than or equal to the multiple rule value "7", the division unit 222b divides the subtraction value LEN by the value of powers of 2 "4" (third division), and sets division results to the quotient N and the remainder M, respectively, as follows.

14/4=3 (quotient N=3)

14 mod 4=2 (remainder M=2)

Subsequently, the subtraction value determination unit 222c subtracts a quotient "3" in the subtraction pattern table 225b, which corresponds to the remainder M ("2"), from the quotient N ("3"), and defines a subtraction value, obtained by the subtraction, as LEN.

3−3=0 (subtraction value LEN=0)

In addition, since the subtraction value LEN is neither greater than nor equal to the multiple rule value "7", the subtraction value determination unit 222c determines whether or not the combination of the quotient N and the remainder M is to be found in the subtraction pattern table 225b. In this case, the subtraction value determination unit 222c determines that the combination of the quotient N ("3") and the remainder M ("2") is in the subtraction pattern table 225b. Accordingly, the data length determination unit 223 determines that the data length of the reception packet is a normal length, and gives notice of "acceptable determination" as the determination result.

In addition, a case in which whether or not the actual packet length is a multiple of the multiple rule value "7" ($=2^2+3$) is determined using "4" ($2^2$), which is a value of powers of 2, when the actual packet length is "239" (bytes: omitted hereinafter) will be described.

As described later, the division unit 222b divides the actual packet length "239" (LEN) by a value of powers of 2 "4" (first division), and sets division results to the quotient N and the remainder M, respectively.

239/4=59 (quotient N=59)
239 mod 4=0 (remainder M=3)

Subsequently, the subtraction value determination unit 222c subtracts a quotient "1" in the subtraction pattern table 225b (refer to FIG. 6), which corresponds to the remainder M ("3"), from the quotient N ("59"), and defines a subtraction value, obtained by the subtraction, as LEN.

59−1=58 (subtraction value LEN=58)

In addition, since, in the subtraction value determination unit 222c, the subtraction value LEN is greater than or equal to the multiple rule value "7", the division unit 222b divides the subtraction value LEN by the value of powers of 2 "4" (second division), and sets division results to the quotient N and the remainder M, respectively, as follows.

58/4=14 (quotient N=14)
58 mod 4=0 (remainder M=2)

Subsequently, the subtraction value determination unit 222c subtracts a quotient "3" in the subtraction pattern table 225b, which corresponds to the remainder M ("2"), from the quotient N ("14"), and defines a subtraction value, obtained by the subtraction, as LEN.

14−3=11 (subtraction value LEN=11)

In addition, since, in the subtraction value determination unit 222c, the subtraction value LEN is greater than or equal to the multiple rule value "7", the division unit 222b divides the subtraction value LEN by the value of powers of 2 "4" (third division), and sets division results to the quotient N and the remainder M, respectively, as follows.

11/4=2 (quotient N=2)
11 mod 4=3 (remainder M=3)

Subsequently, the subtraction value determination unit 222c subtracts a quotient "1" in the subtraction pattern table 225b, which corresponds to the remainder M ("3"), from the quotient N ("2"), and defines a subtraction value, obtained by the subtraction, as LEN.

2−1=0 (subtraction value LEN=1)

In addition, since the subtraction value LEN is neither greater than nor equal to the multiple rule value "7", the subtraction value determination unit 222c determines whether or not the combination of the quotient N and the remainder M is to be found in the subtraction pattern table 225b. In this case, the subtraction value determination unit 222c determines that the combination of the quotient N ("2") and the remainder M ("3") is not in the subtraction pattern table 225b. Accordingly, the data length determination unit 223 determines that the data length of the reception packet is not a normal length, and gives notice of "unacceptable determination" as the determination result.

[Multiple Determination Based on Multiple Rule Value "26"]

A case in which whether or not the actual packet length is a multiple of the multiple rule value "26" is determined when the actual packet length is "338" (bytes: omitted hereinafter) will be described. First, since the multiple rule value "26" is a multiple of "2" (2*13), the packet determination processing operation performs a primary determination operation in which whether or not the actual packet length is divisible by "2" is determined. In addition, when it is determined that the actual packet length is divisible by "2", the packet determination processing operation performs a secondary determination operation in which whether or not a quotient, which is a division result obtained by the division using "2" as a divisor, is divisible by "13" is determined.

As described later, the division unit 222b divides the actual packet length "338" (LEN) by "2", and sets division results to the quotient N and the remainder M, respectively, so as to perform the primary determination operation.

338/2=169 (quotient N=169)
338 mod 2=0 (remainder M=0)

Since the remainder M is "0", and it is determined that the actual packet length "338" is divisible by "2", the division unit 222b determines that the primary determination result is acceptable, and defines the quotient N ("169") as LEN.

Subsequently, using a value of powers of 2 "8" ($2^3$), the division unit 222b performs the secondary determination operation in which whether or not LEN "169" is a multiple of the multiple rule value 13 (=$2^3$+5) is determined. As described later, the division unit 222b divides "164" (LEN) by a value of powers of 2 "8" (first division), and sets division results to the quotient N and the remainder M, respectively.

169/8=21 (quotient N=21)
169 mod 8=1 (remainder M=1)

Subsequently, the subtraction value determination unit 222c subtracts a quotient "8" in the subtraction pattern table 225b (refer to FIG. 7), which corresponds to the remainder M ("1"), from the quotient N ("21"), and defines a subtraction value, obtained by the subtraction, as LEN.

21−8=13 (subtraction value LEN=13)

In addition, since, in the subtraction value determination unit 222c, the subtraction value LEN is greater than or equal to the multiple rule value "13", the division unit 222b divides the subtraction value LEN by the value of powers of 2 "8" (second division), and sets division results to the quotient N and the remainder M, respectively, as follows.

13/8=1 (quotient N=1)
13 mod 8=5 (remainder M=5)

Subsequently, the subtraction value determination unit 222c subtracts a quotient "1" in the subtraction pattern table 225b, which corresponds to the remainder M ("5"), from the quotient N ("1"), and defines a subtraction value, obtained by the subtraction, as LEN.

1−1=0 (subtraction value LEN=0)

In addition, since the subtraction value LEN is neither greater than nor equal to the multiple rule value "13", the subtraction value determination unit 222c determines whether or not the combination of the quotient N and the remainder M is to be found in the subtraction pattern table 225b. In this case, the subtraction value determination unit 222c determines that the combination of the quotient N ("1") and the remainder M ("5") is in the subtraction pattern table 225b. Accordingly, the data length determination unit 223 determines that the data length of the reception packet is a normal length, and gives notice of "acceptable determination" as the determination result.

In addition, a case in which whether or not the actual packet length is a multiple of the multiple rule value "26" is determined when the actual packet length is "742" (bytes: omitted hereinafter) will be described.

Since the multiple rule value 26 is a multiple of "2" (2*13), the division unit 222b divides the actual packet length "742" (LEN) by "2", and sets division results to the quotient N and the remainder M, respectively, so as to perform the primary determination operation, as described later.

742/2=371 (quotient N=371)
742 mod 2=0 (remainder M=0)

Since the remainder M is "0", and it is determined that the actual packet length "742" is divisible by "2", the division unit 222b determines that the primary determination result is acceptable, and defines the quotient N ("371") as LEN.

Subsequently, using a value of powers of 2 "8" ($2^3$), the division unit 222b performs the secondary determination operation in which whether or not LEN "371" is a multiple of the multiple rule value 13 (=$2^3$+5) is determined. As described later, the division unit 222b divides "371" (LEN) by a value of powers of 2 "8" (first division), and sets division results to the quotient N and the remainder M, respectively.

371/8=46 (quotient N=46)

371 mod 8=3 (remainder M=3)

Subsequently, the subtraction value determination unit 222c subtracts a quotient "11" in the subtraction pattern table 225b (refer to FIG. 7), which corresponds to the remainder M ("3"), from the quotient N ("46"), and defines a subtraction value, obtained by the subtraction, as LEN.

46−11=35 (subtraction value LEN=35)

In addition, since, in the subtraction value determination unit 222c, the subtraction value LEN is greater than or equal to the multiple rule value "13", the division unit 222b divides the subtraction value LEN by the value of powers of 2 "8" (second division), and sets division results to the quotient N and the remainder M, respectively, as follows.

35/8=4 (quotient N=4)

35 mod 8=3 (remainder M=3)

Subsequently, the subtraction value determination unit 222c subtracts a quotient "11" in the subtraction pattern table 225b, which corresponds to the remainder M ("3"), from the quotient N ("4"), and defines a subtraction value, obtained by the subtraction, as LEN.

4−11=−7 (subtraction value LEN=−7)

In addition, since the subtraction value LEN is neither greater than nor equal to the multiple rule value "13", the subtraction value determination unit 222c determines whether or not the combination of the quotient N and the remainder M is to be found in the subtraction pattern table 225b. In this case, the subtraction value determination unit 222c determines that the combination of the quotient N ("4") and the remainder M ("3") is not in the subtraction pattern table 225b. Accordingly, the data length determination unit 223 determines that the data length of the reception packet is not a normal length, and gives notice of "unacceptable determination" as the determination result.

[Example of Application According to Second Embodiment]

Figure 10:
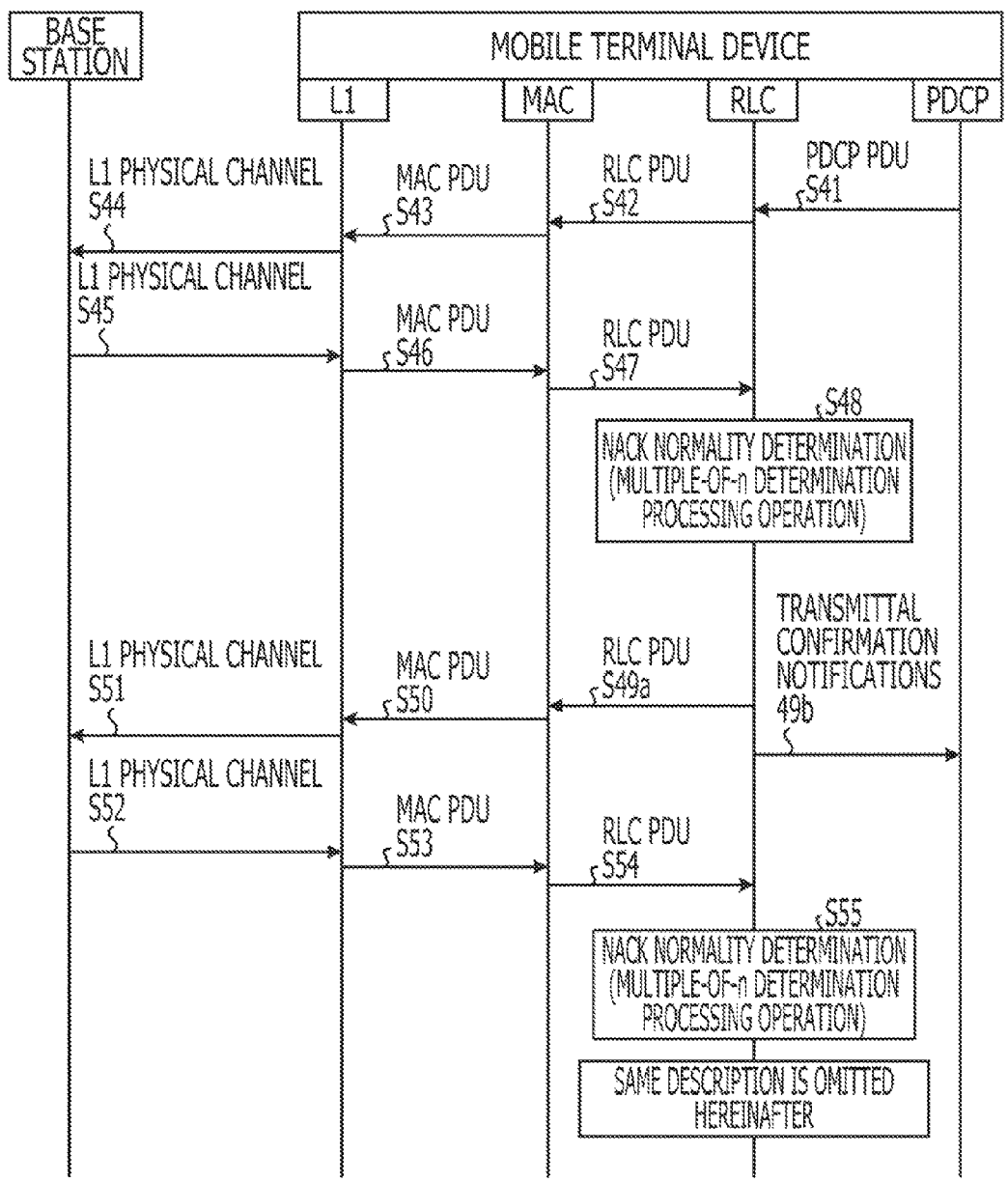
FIG. 10 is a sequence diagram illustrating an example of application of a mobile terminal device according to the second embodiment.

Next, an example in which the communication device according to the second embodiment is applied to a mobile terminal device will be described with reference to FIG. 10. FIG. 10 is a sequence diagram illustrating an example of application of the mobile terminal device according to the second embodiment. In addition, the mobile terminal device includes a layer 1 (abbreviated as "L1", hereinafter) that is a physical layer and a layer 2 including three sublayers such as packet data convergence protocol (PDCP), radio link control (RLC), and media access control (MAC).

First, when data is transmitted from the mobile terminal device side to a base station side, the mobile terminal device transmits data (protocol data unit: PDU), which the PDCP layer receives from an upper layer, to the base station through the RLC layer, the MAC layer, and the L1 (Operations S41 to S44). In addition, in response to data received from the mobile terminal device, the base station returns reception acknowledgement information (status PDU) (Operation S45).

Subsequently, the mobile terminal device transmits data, which the L1 receives from the base station, to the RLC layer through the MAC layer (Operations S46 to S47). In addition, when the received data is "ACK", the RLC layer notifies the PDCP layer of ACK information included in the data (Operation S49b). In addition, the PDCP layer releases corresponding transmission data from the ACK information given notice of. On the other hand, when the received data is "NACK", the RLC layer performs a packet determination processing operation based on a multiple rule value (Operation S48). In addition, when it is determined that a reception data length is a multiple of the multiple rule value, the RLC layer determines that the reception data length is a normal length. In addition, the RLC layer reads out corresponding transmission data from the NACK information in the data, and performs a retransmission processing operation for the base station (Operations S49a to S51). In addition, the base station returns reception acknowledgement information for the data received from the mobile terminal device (Operation S52).

Subsequently, the mobile terminal device processes the data received from the base station, in substantially the same way as operations described with reference to Operations S46 to S48 (Operations S53 to S55).

In this way, the packet determination processing operation can be applied to multiple determination for a reception packet, executed in inter-layer communication (communication performed between the MAC layer and the RLC layer) performed in the mobile terminal device. In this case, the MAC layer and the PDCP layer turn out to include the communication devices 3a and 3b to which the second embodiment is applied, respectively. In addition, the packet determination processing operation can be implemented, by describing the algorithm thereof in RTL, in a device such as a large scale integration (LSI), a field programmable gate array (FPGA), a programmable logic device (PLD), or the like. In addition, the packet determination processing operation can be implemented, by using the algorithm thereof, in software based on firmware control performed in a digital signal processor (DSP).

[Advantageous Effect of Second Embodiment]

According to the second embodiment, in the communication device 2, the subtraction pattern table 225b is generated so as to determine whether or not an integer number L, which is the actual packet length of a reception packet, is a multiple of a specified integer number ($2^\beta$+α) where β is a positive integer number and α is a positive integer number other than integral multiples of 2 (namely, whether or not L is divisible by the specified integer number ($2^\beta$+α)). The subtraction pattern table 225b stores therein quotients and remainders with associating the quotients and the remainders with multiplication values obtained by multiplying a specified integer number by integer numbers ranging from 1 to $2^\beta$, respectively, the quotients and the remainders being obtained by dividing the multiplication values by $2^\beta$, respectively. In addition, the division unit 222b sets the integer number L as a dividend, and divides the dividend by $2^\beta$, thereby calculating a quotient N and a remainder M based on the division. In addition, the subtraction value determination unit 222c obtains a quotient $N_p$ (P= one of integer numbers ranging from 1 to X), which corresponds to the remainder M, from the subtraction pattern table 225b. In addition, when the subtraction value determination unit 222c determines that a subtraction value (N−$N_p$), which is obtained by subtracting the obtained quotient $N_p$ from the quotient N, is greater than the specified integer number, the division unit 222b furthermore sets the subtraction value (N−$N_p$) as the dividend, and divides the dividend by $2^\beta$. In addition, as long as the subtraction value (N−$N_p$) is greater the specified integer number, the division unit 222b sets the subtraction value (N−$N_p$) as the dividend, and repeatedly divides the dividend by $2^\beta$. In addition, in a case in which the combination of the quotient N and the remainder M, at the time the subtraction value (N−$N_p$) has become less than or equal to the specified integer number for the first time, is in the subtraction pattern table 225*b*, the data length determination unit 223 determines that L is a multiple of the specified integer number (namely, L is divisible by the specified integer number).

Accordingly, when the communication device 2 performs the multiple determination, based on the specified integer number, with respect to the integer number L, the remainder M obtained by dividing the dividend by $2^\beta$ matches a remainder in the subtraction pattern table 225*b*, obtained by dividing a multiplication value by $2^\beta$, the multiplication value being obtained by multiplying the specified integer number by an integer number. Therefore, the following equation is met.

$$\text{The subtraction value } (N-N_P) = (\text{the dividend} - (\text{the multiplication value that corresponds to the quotient } N_P \text{ and is obtained by multiplying the specified integer number by the integer number}))/2^\beta \quad (2)$$

On the basis of the equation (2), the communication device 2 subtracts at a time the multiplication value, obtained by multiplying the specified integer number by the integer number, from the dividend, and furthermore performs multiple determination, based on the specified integer number, with respect to the subtraction value. Therefore, the multiple determination can be performed at high speed. Furthermore, by setting $2^\beta$ as a divisor, the communication device 2 can use a shift operation, thereby calculating a remainder at high speed. As a result, the communication device 2 can determine at high speed whether or not the integer L is a multiple of the specified integer number.

Figure 11:
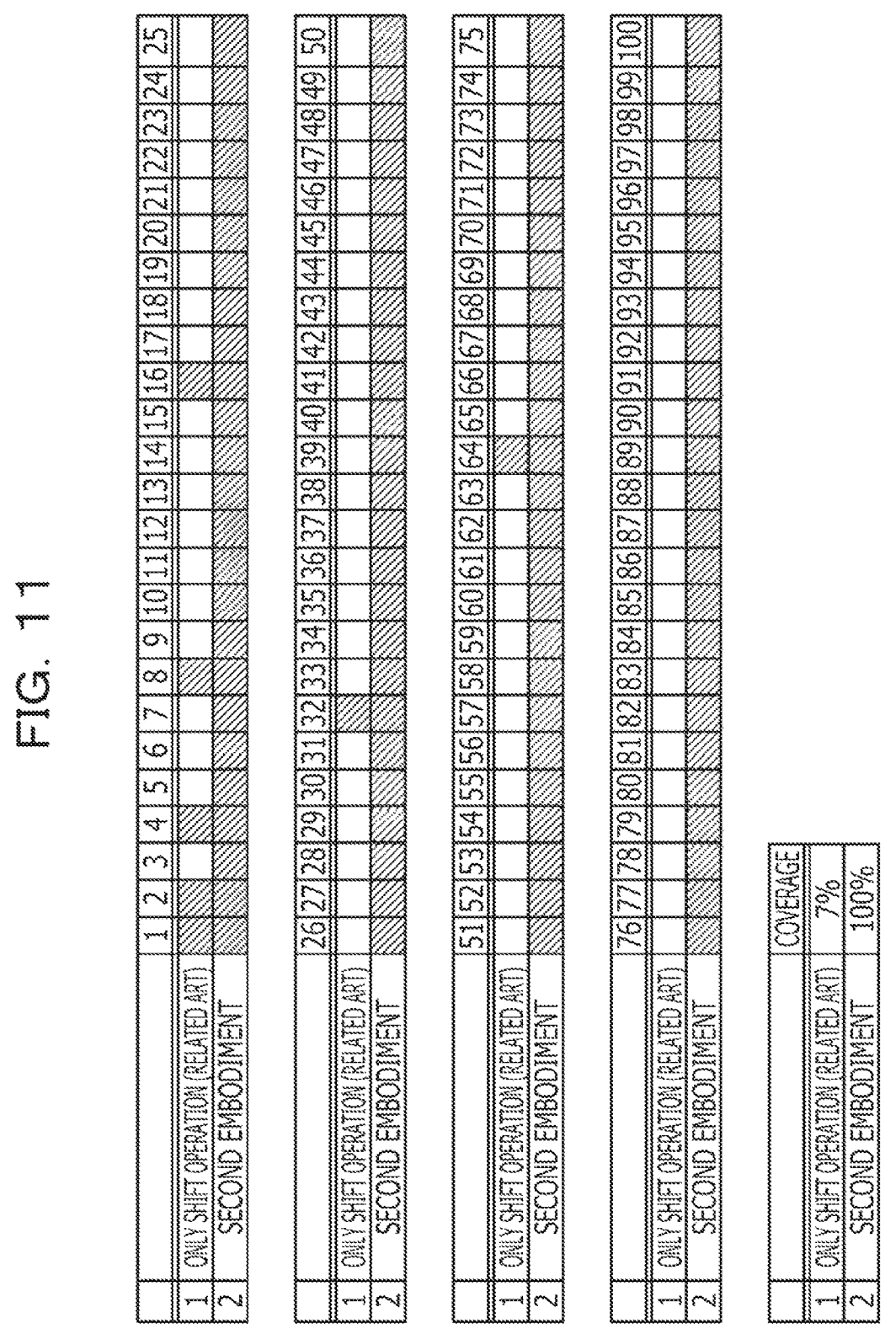

In addition, as illustrated in FIG. 11, hatched areas in the illustrated table indicate positive integer numbers which can be subjected to multiple regularity determination that uses a shift operation (a technique of the related art) and the packet determination processing operation according to the second embodiment. For example, while it is difficult to determine the multiple regularity of "7" using only the shift operation of the related art, the multiple regularity of "7" can be determined on the basis of the second embodiment. As illustrated in FIG. 11, the technique of the related art can perform the packet determination processing operation based on the multiple regularity determination on, for example, no more than 7% of numerical values "1" to "100". In addition, on the basis of the packet determination processing operation illustrated in the second embodiment, 100% of numerical values "1" to "100" can be subjected to the packet determination processing operation based on the multiple regularity determination. In this way, in the communication device 2 according to the second embodiment, numerical values, the number of which is about 14 times that of numerical values that can be subjected to the packet determination processing operation based only on the shift operation, can be subjected to the packet determination processing operation based on the multiple regularity determination. Accordingly, the multiple regularity determination for various packet lengths can be flexibly performed at high speed. Therefore, it is possible to reduce the scale and power consumption of the communication device 2.

In addition, according to the second embodiment, the subtraction pattern generation unit 224 divides multiplication values by $2^\beta$, the multiplication values being obtained by multiplying a specified integer number by integer numbers ranging from 1 to $2^\beta$, respectively, and calculate quotients and remainders. In addition, the subtraction pattern table 225*b* stores therein the quotients and the remainders for the individual multiplication values, calculated by the subtraction pattern generation unit 224, associated with the multiplication values, respectively. Accordingly, the communication device 2 can automatically generate the subtraction pattern table 225*b*, and hence effectively create an environment for performing the packet determination processing operation.

In addition, according to the second embodiment, in each communication device, when the communication device is started up, the subtraction pattern generation unit 224 calculates quotients and remainders for the individual multiplication values, and stores the quotients and the remainders in the subtraction pattern table 225*b* associated with the multiplication values, respectively. Accordingly, in the communication device 2, when the communication device 2 is started up, the quotients and the remainders for the individual multiplication values are calculated. Therefore, the packet determination processing operation can be performed at high speed, compared with a case in which the quotients and the remainders for the individual multiplication values are calculated every time the packet determination processing operation is performed.

In addition, according to the second embodiment, the multiple rule table 225*a* stores therein a plurality candidate values for the specified integer number in a rewritable manner. In addition, in accordance with the packet length multiple rule type obtained from the header information of the reception data, the division unit 222*b* selects, as the specified integer number, one candidate value from among the plurality candidate values for the specified integer number stored in the multiple rule table 225*a*. Accordingly, the packet length multiple rule is handled flexibly, and hence whether or not the packet length of a packet is a normal length can be determined with respect to various packet length multiple rules.

[Other Issues]

In the communication device 2 according to the second embodiment described above, the case in which whether or not the actual packet length of a reception packet is the integral multiple of the specified integer number ($2^\beta+\alpha$) is determined has been described. The second embodiment is not limited to the case, and the packet determination processing unit 220 can be applied as a multiple determination circuit, using substantially the same configuration. When being applied as the multiple determination circuit, the packet determination processing unit 220 only has to have a configuration in which the header information determination processing unit 221 is deleted. In addition, the division processing unit 222 only has to input a dividend and a specified integer number. Accordingly, the multiple determination circuit can perform the multiple determination using a simpler algorithm. In addition, for example, when an image input device, an image output device, or the like determines pixel coordinates, hardware can be implemented with a reduced processing load and with a simpler configuration than processing circuits. Therefore, the image input device and the image output device can achieve improved processing performance.

In addition, it is not necessary for individual configuration elements in the communication device 2 illustrated to physically have substantially the same configurations as those illustrated. Namely, the specific form of distributing and integrating the communication device 2 is not limited to those specifically illustrated in the drawings, and all of or a part of the device may be modified by functionally or physically distributing and integrating the device on the basis of an arbitrary unit in response to various loads or the usage situation of the device. For example, the division processing unit 222 and the data length determination unit 223 may be integrated as one unit. On the other hand, in response to the packet length multiple identification type, the division unit 222*b* may be distributed to a multiple rule value selection section, which selects, as the specified integer number, one multiple rule value from the multiple rule table 225a, and a division unit, which divides a dividend by $2^\beta$ calculated from among the specified integer number ($2^\beta+\alpha$). In addition, as an external device for the communication device 2, the storage unit 225 may be connected through a network.

In addition, all of or an arbitrary part of individual processing functions performed in the communication device 2 may be realized by a central processing unit (CPU) (or a microcomputer such as a micro processing unit (MPU), a micro controller unit (MCU), or the like), and a program analyzed and executed in the CPU (or the microcomputer such as the MPU, the MCU, or the like), or by hardware using wired logic.

The program implementing the embodiments may be recorded on computer-readable media comprising computer-readable recording media. The program implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. The computer-readable media comprise all computer-readable storage media with the sole exception being a transitory, propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiments of the present invention have been described in detail, it should be understood that the various changes, substitutions, and alterations could be made hereto without departing from the spirit and scope of the invention.

What is claimed is:

1. A communication device comprising:
a storage unit to store plural combinations of quotients and remainders associated with multiplication values obtained by multiplying a specified integer number, which is expressed in a form of ($2^\beta+\alpha$) where $\beta$ is a positive integer number and $\alpha$ is a positive integer number other than integral multiples of 2, by integer numbers ranging from 1 to $2^\beta$, respectively, the quotients and the remainders being obtained by dividing the multiplication values by $2^\beta$, respectively;
a dividend setting unit to set, as a dividend, a data length of received packet data;
a division unit to divide the dividend, set by the dividend setting unit, by $2^\beta$ and calculate a first quotient and a first remainder;
a subtraction value determination unit to obtain a second quotient that is stored in the storage unit in combination with the first remainder calculated by the division unit, from the storage unit, and determine whether or not a subtraction value, obtained by subtracting the obtained second quotient from the first quotient calculated by the division unit, is greater than the specified integer number; and
a data length determination unit to determine that the data length of the packet data is a normal length, when the subtraction value determination unit determines that the subtraction value is not greater than the specified integer number and that a combination of the first quotient and the first remainder calculated by the division unit is stored in the storage unit, wherein
the dividend setting unit sets the subtraction value as the dividend when the subtraction value determination unit determines that the subtraction value is greater than the specified integer number.

2. The communication device according to claim 1, further comprising:
a calculation unit to divide multiplication values by $2^\beta$, the multiplication values being obtained by multiplying the specified integer number by integer numbers ranging from 1 to $2^\beta$, respectively, and calculate quotients and remainders, wherein
the storage unit stores the quotients and the remainders for the individual multiplication values, calculated by the calculation unit, with associating the quotients and the remainders with the multiplication values, respectively.

3. The communication device according to claim 1, wherein
in each communication device, when the communication device is started up, the calculation unit calculates quotients and remainders for the individual multiplication values, and stores the quotients and the remainders in the storage unit associated with the multiplication values, respectively.

4. The communication device according to claim 1, further comprising:
a register unit to store a plurality of candidate values for the specified integer number in a rewritable manner; and
a candidate value selecting unit to select, from among the plurality of candidate values stored in the register unit, a candidate value as the specified integer number in accordance with a type of the data length of the packet data, obtained from header information of the packet data.

5. A reception data length determination method executed by a processor of a communication device, the method comprising:
storing, in a storage unit, plural combinations of quotients and remainders associated with multiplication values obtained by multiplying a specified integer number, which is expressed in a form of ($2^\beta+\alpha$) where $\beta$ is a positive integer number and $\alpha$ is a positive integer number other than integral multiples of 2, by integer numbers ranging from 1 to $2^\beta$, respectively, the quotients and the remainders being obtained by dividing the multiplication values by $2^\beta$, respectively;
setting, as a dividend, a data length of received packet data;
dividing the set dividend by $2^\beta$ to calculate a first quotient and a first remainder;
obtaining a second quotient that is stored in the storage unit in combination with the calculated remainder, from the storage unit, and determining whether or not a subtraction value, obtained by subtracting the obtained second quotient from the calculated first quotient, is greater than the specified integer number;
determining that the data length of the packet data is a normal length, when, in the determining, it is determined that the subtraction value is not greater than the specified integer number, and it is determined that a combination of the first quotient and the first remainder calculated by the division unit is stored in the storage unit; and
setting the subtraction value as the dividend when, in the determining, it is determined that the subtraction value is greater than the specified integer number.

6. A multiple determination circuit comprising:

a storage unit to store plural combinations of quotients and remainders associated with multiplication values obtained by multiplying a specified integer number, which is expressed in the form of $(2^\beta+\alpha)$ where $\beta$ is a positive integer number and $\alpha$ is a positive integer number other than integral multiples of 2, by integer numbers ranging from 1 to $2^\beta$, respectively, the quotients and the remainders being obtained by dividing the multiplication values by $2^\beta$, respectively;

a dividend setting unit to set, as a dividend, a data length of received packet data;

a division unit to divide the dividend, set by the dividend setting unit, by $2^\beta$ and calculate a first quotient and a first remainder;

a subtraction value determination unit to obtain a second quotient that is stored in the storage unit in combination with the first remainder calculated by the division unit, from the storage unit, and determine whether or not a subtraction value, obtained by subtracting the obtained second quotient from the first quotient calculated by the division unit, is greater than the specified integer number; and a data length determination unit to determine that the data length of the packet data is a normal length, when the subtraction value determination unit determines that the subtraction value is not greater than the specified integer number and that a combination of the first quotient and the first remainder calculated by the division unit is stored in the storage unit, wherein the dividend setting unit sets the subtraction value as the dividend when the subtraction value determination unit determines that the subtraction value is greater than the specified integer number.

7. A non-transitory computer readable recording medium that stores therein a reception data length determination program that causes a communication device to perform a processing operation, the processing operation comprising:

storing, in a storage unit, plural combinations of quotients and remainders associated with multiplication values obtained by multiplying a specified integer number, which is expressed in a form of $(2^\beta+\alpha)$ where $\beta$ is a positive integer number and $\alpha$ is a positive integer number other than integral multiples of 2, by integer numbers ranging from 1 to $2^\beta$, respectively, the quotients and the remainders being obtained by dividing the multiplication values by $2^\beta$, respectively;

setting, as a dividend, a data length of received packet data;

dividing the set dividend by $2^\beta$ to calculate a first quotient and a first remainder;

obtaining a second quotient that is stored in the storage unit in combination with the calculated remainder, from the storage unit, and determining whether or not a subtraction value, obtained by subtracting the obtained second quotient from the calculated first quotient, is greater than the specified integer number;

determining that the data length of the packet data is a normal length, when, in the determining, it is determined that the subtraction value is not greater than the specified integer number, and it is determined that a combination of the first quotient and the first remainder calculated by the division unit is stored in the storage unit; and setting the subtraction value as the dividend when, in the determining, it is determined that the subtraction value is greater than the specified integer number.

\* \* \* \* \*